United States Patent
Klingebiel et al.

(10) Patent No.: US 12,049,124 B2
(45) Date of Patent: Jul. 30, 2024

(54) PTC HEATING ASSEMBLY AND METHOD FOR MANUFACTURING THE SAME

(71) Applicant: Eberspächer catem GmbH & Co. KG, Herxheim (DE)

(72) Inventors: Andreas Klingebiel, Marbach am Neckar (DE); Dietmar Wunstorf, Hildesheim (DE); Karsten Bolz, Kandel (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 355 days.

(21) Appl. No.: 17/320,415

(22) Filed: May 14, 2021

(65) Prior Publication Data
US 2021/0354530 A1    Nov. 18, 2021

(30) Foreign Application Priority Data

May 15, 2020 (DE) ..................... 10 2020 113 254.9

(51) Int. Cl.
| | | |
|---|---|---|
| B60H 1/22 | (2006.01) | |
| F24H 9/18 | (2022.01) | |
| F24H 9/1863 | (2022.01) | |
| H05B 3/50 | (2006.01) | |

(52) U.S. Cl.
CPC ......... B60H 1/2215 (2013.01); F24H 9/1872 (2013.01); H05B 3/50 (2013.01); *H05B 2203/02* (2013.01)

(58) Field of Classification Search
CPC .... F24H 9/1818; F24H 9/1827; F24H 9/1863; F24H 9/1872; F24H 2250/04; B60H 1/2215; H05B 2203/017; H05B 2203/02–022
See application file for complete search history.

(56) References Cited

U.S. PATENT DOCUMENTS

| | | |
|---|---|---|
| 8,946,599 B2 | 2/2015 | Niederer et al. |
| 10,724,736 B2 | 7/2020 | Aleysa |
| 2008/0000889 A1* | 1/2008 | Niederer ............ F24H 3/082 219/205 |
| 2012/0061366 A1* | 3/2012 | Kohl ................ H05B 3/50 219/202 |
| 2019/0120523 A1 | 4/2019 | Base et al. |

FOREIGN PATENT DOCUMENTS

| | | |
|---|---|---|
| CN | 103182918 A | 7/2013 |
| CN | 103423871 A | 12/2013 |
| CN | 107791786 A | 3/2018 |
| DE | 29 48 592 | 6/1981 |
| DE | 10258257 A1 * | 7/2003 ......... F02M 31/125 |

(Continued)

*Primary Examiner* — Justin C Dodson
(74) *Attorney, Agent, or Firm* — Boyle Fredrickson S.C.

(57) ABSTRACT

A PTC heating assembly includes a heating cell comprising a PTC element and conductor elements electrically abutting the PTC element. The heating cell is accommodated in a heater housing. The heater housing is manufactured with undersize relative to the heating cell so that the heating cell, after insertion into the heater housing, is held under pretension between mutually opposing walls of the heater housing. Accordingly, in the method according to the invention, the heater housing is elastically widened when the heating cell is inserted into the heater housing.

13 Claims, 3 Drawing Sheets

(56) References Cited

FOREIGN PATENT DOCUMENTS

| | | |
|---|---|---|
| DE | 102012025445 A1 | 6/2013 |
| DE | 10 2017 103 039 | 6/2018 |
| EP | 1 768 457 | 3/2007 |
| EP | 1523224 B2 * | 11/2009 ............... H05B 3/42 |
| EP | 2 127 924 | 12/2009 |
| EP | 2 428 747 | 3/2012 |
| EP | 2 685 784 | 1/2014 |
| EP | 2 724 086 | 10/2018 |
| KR | 20140027848 A | 3/2014 |
| WO | 2019048491 A1 | 3/2019 |

* cited by examiner

PTC HEATING ASSEMBLY AND METHOD FOR MANUFACTURING THE SAME

BACKGROUND OF THE INVENTION

1. Field of the Invention

The present invention relates to a PTC heating assembly with a heating cell which is accommodated in a heater housing. The heater housing typically forms heat-emitting surfaces enclosing the PTC element and sealing it from the environment. The heater housing typically circumferentially encloses the PTC element. The heater housing may be formed by a heating tube or heating sleeve that accommodates the heating cell therein.

2. Background of the Invention

A generic PTC heating assembly is known from EP 2 724 086 B1, EP 2 685 784 A1, EP 1 768 457 A1, or EP 2 127 924 A1.

PTC heating assemblies of the type mentioned introductorily are usually used in heating devices for motor vehicles. The object of the corresponding heating assemblies is to generate heat and to dissipate it as efficiently as possible to the medium to be heated. The PTC heating assembly comprises the PTC element, which is provided in electrical contact in the heater housing. If the heater housing is made of metal, an insulation in the form of a film or a ceramic layer or a combination of both is provided between the PTC element and/or a contact plate abutting thereon. In The present invention, as in the prior art according to EP 1 768 457 A1, the PTC element together with the strip conductors is usually accommodated in a gas- or fluid-tight manner in the heater housing, which in view of good heat dissipation is intended to have a relatively thin wall thickness. Sometimes the heater housing is also made of metal with regard to electromagnetic shielding.

For good efficiency, it is important that the PTC element is connected in a good heat-conducting manner to the heat-emitting outside of the heater housing.

There are several possibilities to achieve this.

According to EP 1 768 457 A1, the PTC element is accommodated in a position frame which forms a receptacle for the PTC element, which circumferentially surrounds the PTC element. This recess is padded on both sides with the contact plates, which directly contact the PTC element in an electrically conductive manner. On the side of the contact plates opposite the PTC element, there is an insulating layer made of a ceramic plate with a plastic film, which are elastically supported against the position frames by means of an elastic seal so that a compressive force acting from outside at right angles to the main side surfaces of the PTC element can act on the layers of the aforementioned structure and apply them against each other so that the heat from the PTC element can be dissipated with low heat resistance on the outer surface of the insulating layer.

This structure requires various components of the heating cell and accordingly a multitude of manufacturing steps, and for its functioning, it requires a flawless seal, in particular a permanent elasticity of the elastic seal. In addition, an elastic pretension force must act permanently from the outside.

Motor vehicles are subjected to considerable vibrations. Motor vehicles are also used in very different climatic regions so that the components are subjected to different temperatures. A PTC heating assembly of the type mentioned above must also function under these conditions.

Thus, the PTC heating assembly, as well as a heating device of a motor vehicle comprising the PTC heating assembly, which the present invention is particularly intended to further develop, must function without interference under these conditions, namely over the expected running time of the vehicle.

In an alternative configuration known from EP 2 127 924 A1, the heating cell is first preassembled and then inserted into a U-shaped recess. Thereafter, a wedge is also inserted into the U-shaped recess, by means of which the heat-emitting main side surfaces of the PTC heating assembly are abutted on the one hand against an inner surface of the recess and on the other hand against the wedge, which in turn is formed from a material with good heat conductivity and is in contact with the opposite inner surface of the recess. The accommodating recess is formed inside a heating rib, which is exposed in a heating chamber/circulation chamber.

This configuration also requires a large number of components to be initially manufactured separately, which must be assembled and joined in an appropriate manner to allow good heat dissipation from the PTC element. The one-sided arrangement of a wedge element interferes with the inherently desirable symmetrical dissipation of heat to both main side surfaces of the PTC element.

In an alternative solution known from EP 2 428 747 A 1, the heating cell is inserted into a tubular heater housing, which is then filled with a sealing compound to allow good heat dissipation from the PTC element to the outside of the heating tube.

This configuration also requires precise process control in the manufacture of the heating assembly. The sealing compound must also cure so that a curing or drying time must be interposed as part of the manufacturing process.

SUMMARY

The present invention aims to provide a PTC heating assembly that can be manufactured in a small number of method steps. The PTC heating assembly and the method applicable to the manufacture thereof are intended to be suitable for mass production with consistent quality of the manufactured PTC heating assemblies.

In view of this, the present invention proposes a PTC heating assembly including a heating cell comprising a PTC element and conductor elements electrically abutting the PTC element. The heating cell is accommodated in a heater housing. The heater housing is manufactured with undersize relative to the heating cell so that the heating cell, after insertion into the heater housing, is held under pretension between mutually opposing walls of the heater housing.

The conductor elements may be covered with an outer insulation so that the conductor elements of the PTC heating assembly are not directly abutted in an electrically conductive manner a heater housing which accommodates the heating cell therein. The heating cell may include a positioning frame that circumferentially surrounds the PTC element and positions contact plates and applies them against the PTC element in an electrically conductive manner. The positioning frame can also hold and position electrical terminal lugs, which lead to the PTC element for energizing it with different polarity and are extended beyond the actual heating cell so that the electrical terminal lugs can electrically connect the heating cell. This connection is usually made via a plug-in contact of the terminal lugs.

The heating cell is usually manufactured as a pre-assembled unit and module. Accordingly, the PTC element, the strip conductors abutting it, as well as usually the terminal lugs and, if necessary, a position frame as well as an insulation, for example in the form of two insulating layers abutting on opposite main side surfaces, are joined, for example glued or welded or joined into a unit by overmolding a plastic, which can form the position frame.

Compared with this heating cell, the heater housing is manufactured to undersize. In particular, the heater housing has a smaller thickness than the heating cell. In this context, the thickness is usually the smallest extension in a cross-sectional view through the heater housing, wherein the heater housing is configured as a heating tube or heating sleeve. The other two extensions, i.e. the length and the width of the heating cell, extend at right angles to the thickness extension, wherein the width and the thickness span the cross-sectional view and the length extends at right angles thereto. The length usually corresponds to the extension of the heating cell in the direction of insertion into the heating tube or heating sleeve. Hence, the main side surfaces of the heating cell are further spaced from each other than the distance between the inner surfaces of the heating tube or heating sleeve to be applied thereto in a heat-conducting manner before assembly.

Thus, when the heating cell is inserted into the heater housing, the latter is elastically widened. The opposite walls of the heater housing, which are to be applied in a heat-conducting manner to the main side surfaces of the heating cell, are accordingly spaced apart elastically, i.e. widened. Thus, after insertion of the heating cell and solely as a result of insertion of the heating cell into the heater housing, these walls of the heater housing abut the heating cell under pretension. As a result, the layers of the heater cell are pressed against each other, which improves the coupling of the power current into the PTC element, as well as the heat extraction from the PTC element.

It is understood that during the manufacture of the heating cell, the layers of the same can likewise be applied against one another by a pressure acting from the outside and can be bonded to one another, for example, by means of an adhesive. The heating cell used in the electric heating device according to the invention can be manufactured by methods generally known from the prior art. Due to the pretension introduced by the heater housing, the layers of the heating cell can also be connected to one another only provisionally, for example, by a wax or an adhesive that softens with heat so that the heating cell is provided as a unit that can be preassembled, but the connection between the individual layers of the heating cell does not remain a permanent connection during operation of the heating assembly.

For good heat transfer from the heating cell to the outer surface of the PTC heating assembly, no further measures such as deformation of the heater housing after insertion of the heating cell according to EP 2 724 086 B1 and/or casting according to EP 2 428 747 A1 of the same are required. The heating cell abuts against inner surfaces of the heater housing due to a pretension caused by the insertion alone. The inner surfaces directly contact the heating cell after the joining of the same. Specifically, an adhesive or a thermally conductive sealing compound is lacking between the inner surface of the elastically widened walls and the associated main side surface of the heating cell.

The aforementioned main side surface of the heating cell is the largest surface of the usually cuboid PTC element. This main side surface is usually larger by at least a factor of 5 than each of the edge surfaces extending at right angles thereto, which connect the main side surfaces and define the periphery of the PTC element.

With the proposal according to the invention, a PTC heating assembly is provided which can be manufactured reproducibly and economically with low weight using fewer parts.

The aforementioned insulation may be provided as a coating on the inner surface of the opposing walls. Alternatively or additionally, the insulation may surround the main side surfaces of the heating cell as an outer layer and directly abut the inner surface of the opposing walls of the PTC element or contact plates for energizing the PTC element.

The invention also enables the manufacture of PTC heating assemblies according to a modular principle. Thus, either the heater housing can first be inserted into a superordinate structure and then the components of the heating assembly can be inserted into the heater housing by pressing the heating cell, or the entire PTC heating assembly is pre-assembled and inserted into the superordinate structure in this configuration The invention can be realized in particular with thin-walled heater housings made of sheet metal or another material with good thermal conductivity, which can permanently store and hold a certain elastic pretension.

According to a possible further development of the present invention, the heater housing is formed by a flat tube which is closed on one side and whose inner surfaces, which lie opposite one another and abut the heating cell in a heat-conducting manner, are spaced apart from one another by a distance less than the thickness of the heating cells. The inner surfaces can be electrically insulating. Usually, the inner surfaces are formed by the flat tube itself and are made of metal. The flat tube is closed at the bottom and is usually exposed in the manner of a heating rib in a heating chamber. In this context, the flat tube is usually produced to undersize beforehand so that, when the heating cell is inserted, the heater housing is spread and the inner surfaces of the heater housing are applied against the heat-emitting surfaces of the heating cell with pretension. The spreading of the flat tube takes place in the elastic range. The elastic deformation accordingly acts as a permanent pretensioning force against the heat-emitting free or outer surfaces of the heating cell.

The heater housing or the flat tube can first be fitted with the heating cell and then connected to a partition wall of a PTC heating assembly. Alternatively, the heater housing or the flat tube can first be connected to the partition wall and then the heating cell can be inserted from the side of the connection chamber into a receiving pocket formed by the heater housing or the flat tube. The latter variant is particularly suitable if the heater housing is joined to the partition wall by soldering or welding, for example, or if the partition wall is formed integrally with the heater housing to form a heating rib projecting from the partition wall into the heating chamber. The partition wall and/or the heater housing can be made of a metal, in particular a sheet metal.

In view of simplified assembly, it is proposed according to a possible further development of the present invention to configure the insertion opening of the flat tube with a larger clear width than the distance between the inner surfaces. In this context, the insertion opening is usually also larger than the thickness of the heating cell so that, for example, the heating cell can be inserted with clearance into the insertion opening. Accordingly, the heating cell can be easily inserted into the insertion opening during assembly due to the larger size of the insertion opening. The elastic pretension of the inner surfaces, which are in heat-conducting contact with the heating cell in the assembled state, only takes place as the insertion movement progresses.

According to another possible configuration of the present invention, the heating cell has a frame-shaped housing. This is usually made of plastic. The housing forms a receiving space which accommodates at least one PTC element. The strip conductors are connected to this PTC element in an electrically conductive manner. Usually, the main side surfaces of the PTC element are covered with the insulating layers joined by the frame-shaped housing. Thus, the heating cell is formed as a heat-handling unit. The frame-shaped housing is surmounted by contact tongues, which are connected to the strip conductors in an electrically conductive manner for energizing the PTC element with different polarity.

According to a possible further development, the frame-shaped housing may be provided with a wedge-shaped leading frame member. The leading frame member is that frame member which is first inserted into the flat tube when the heating cell is inserted into the flat tube. According to the further development discussed here, this leading frame member is configured in a wedge shape such that the inner surfaces are elastically expanded when the heating cell is inserted into the flat tube. In this context, the wedge shape of the leading frame member is usually selected such that the greatest thickness of the frame member corresponds to the distance between the outer surfaces of the heating cell. If the heating cell has insulating layers, for example in the form of ceramic plates on its outside, the greatest thickness of the leading frame member corresponds to the distance between the outer surfaces of the insulating layers, which form the free surfaces of the heating cell.

Accordingly, when the heating cell is inserted into the flat tube, the leading frame member can expand the latter elastically. The mechanical work required for this does not have to be performed by the functional elements of the heating cell, which serve to generate and extract heat.

The frame-shaped housing may have a trailing frame member which is inserted into the flat tube as a plug. This plug reinforces the flat tube in the area of the insertion opening. This improves the sealing effect of a sealing collar, which is usually made of a soft-elastic plastic and is provided on the outer circumferential surface of the flat tube to seal it around the outside. The sealing collar may be arranged at the level of the trailing frame member. The trailing frame member can be thicker than the leading frame member to form the plug.

BRIEF DESCRIPTION OF THE DRAWINGS

Further details and advantages of the present invention shall arise from the following description of an embodiment of the invention in combination with the drawing, in which.

DETAILED DESCRIPTION

Figure 1:
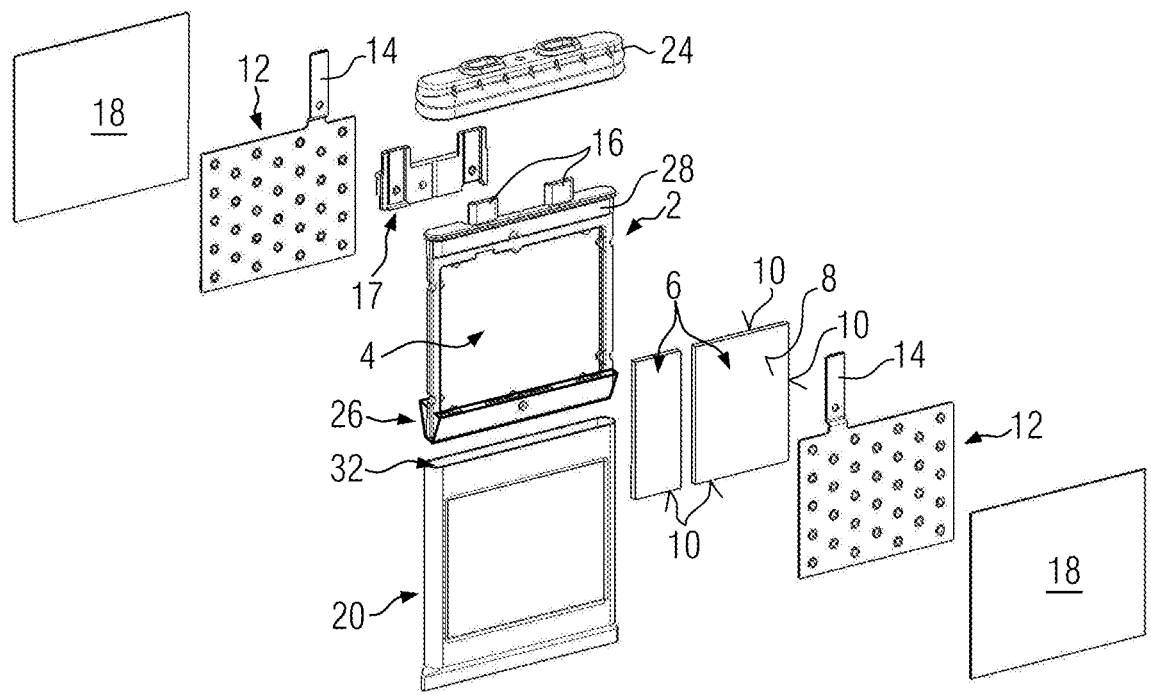
FIG. 1 shows a perspective exploded view of the embodiment of a heating cell.
Figure 2:
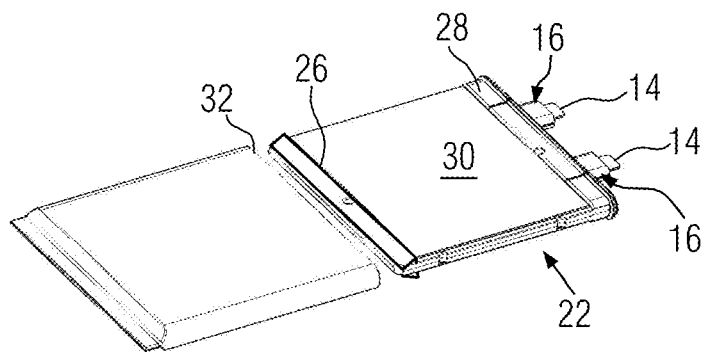
FIG. 2 shows a perspective side view of the embodiment of a PTC heating device shown in FIG. 1 prior to being joined with a flat tube.

The embodiment according to FIG. 1 shows a housing 2 made of plastic, which is configured as a frame and forms an accommodation space 4 to accommodate PTC elements 6. The two PTC elements 6 are each cuboid in shape and have opposing surfaces 8, which define the main side surfaces of the PTC elements 6 that predominantly emit the heat and which are connected to each other by circumferential end surfaces 10. Opposite the surface 8, conductor tracks in the form of contact plates 12 are shown, each of which has a contact strips 14 formed by punching and bending the sheet material. Corresponding to these contact strips 14, the housing is provided with 2 connecting pieces 16 which accommodate the respective contact strips 14 so that the free end of the contact strips 14 protrudes beyond the housing 2. These free ends of the terminal lugs 14 are used to energize the PTC elements 6 within the housing 2. After the contact strips 14 have been inserted, the connecting pieces 16 are covered with a lid 17, which is attached to the housing by hot caulking of pins that protrude from the housing 2 and each pass through a bore in the lid 17.

Reference sign 18 shows insulating layers in the form of aluminum oxide plates whose base area is larger than the base area of the contact plates 12 (without the contact strips 14) and which at least partially cover the frame-shaped housing 2 in the assembled state.

The above-discussed unit is first prefabricated and then inserted into a metal housing 20 made of a sheet metal material, over which a sealing collar 22 made of a soft elastic plastic is drawn at the end in order to insert the heat-generating element identified by reference sign 24 into a receiving pocket of a partition wall, as described in DE 10 2016 224 296 A1, for example.

The casing 2 has a leading frame member which is identified by reference number 26 and which is tapered towards the front and thus wedge-shaped. In FIG. 1, the tapered end points in the direction of the flat tube 20. Reference sign 28 in FIG. 1 indicates a trailing frame member which is arranged opposite the leading frame member 26 and is merely overhung by the connecting pieces 16. The widened end of the forward frame member 26 merges without a shoulder into a heat-emitting open surface 30. This open surface 30 is formed by the outer surface of the respective aluminum oxide plates 18.

Figure 3:
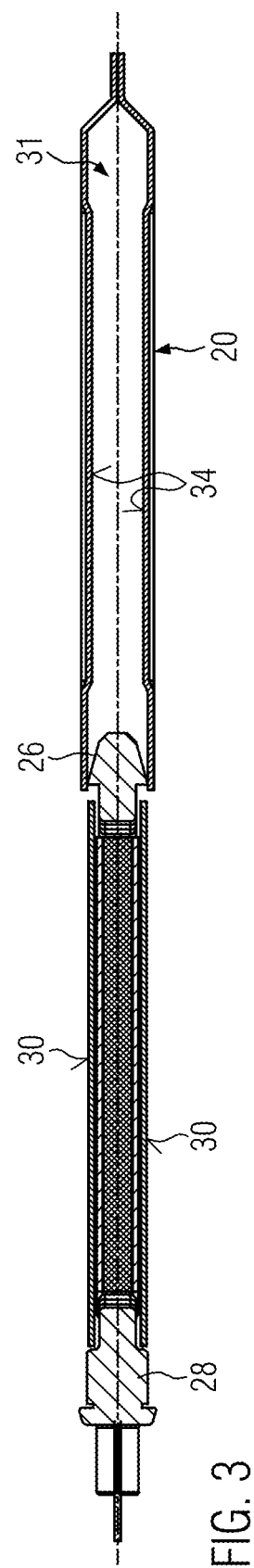
FIG. 3 shows the illustration according to FIG. 2 in a longitudinal sectional view.

The wedge shape of the leading frame member 26 allows the heating cell 22 to be centered during insertion into a receiving pocket 31 formed by the flat tube 20. This centering is shown in FIG. 3. Apparently, the central longitudinal axis of the heating cell 22 is aligned with the central longitudinal axis of the flat tube 20. The leading frame member 26 lies with slight clearance within an insertion opening 32 of the flat tube 20, which leads to the receiving pocket 31.

The flat tube 20 is usually formed by deep-drawing an initially cylindrical semi-finished product, the main side surfaces of which are formed such that the inner surfaces 34 are formed towards each other.

Figure 4:
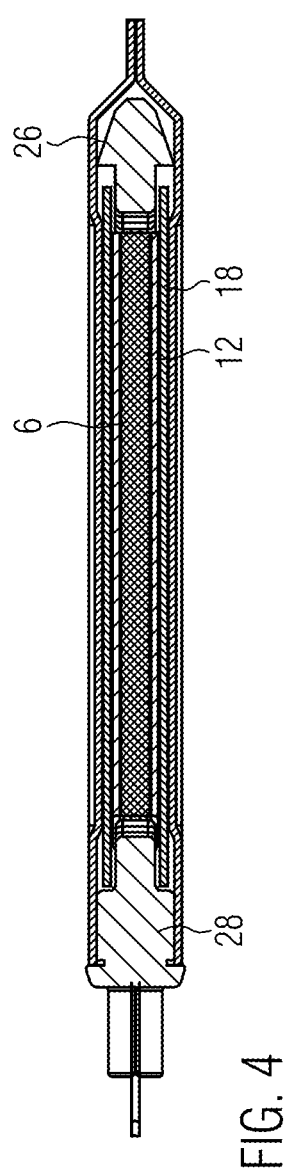
FIG. 4 shows the illustration according to FIG. 3 after joining.

Starting from the initial position shown in FIG. 3, in which the leading frame member 26 is already in the insertion opening 32, the heating cell 22 is inserted into the flat tube 20. In this context, the leading frame member 26 presses outwards inner surfaces 34 which delimit the receiving pocket 31 and the distance between which is less than the thickness of the heating cell 22 in the sectional view according to FIG. 3. The inner surfaces 34 are elastically pretensioned. In the course of the progressive insertion movement, the inner surfaces 34 are applied against the free surfaces 30. The insertion movement is completed when the leading frame member 26 abuts against a lower closed end of the receiving pocket 31 or a widened collar of the trailing frame member 28 is applied against the insertion opening 32 at the end face. As shown in FIG. 4, accordingly, the inner surfaces 34 fully abut against the free surfaces 30 due to elastic deformation. This ensures good heat extraction from the heat generated by the PTC element 6 to the outer surface of the flat tube 20. Following this joining, the sealing collar 24 is pushed over the flat tube 20. Accordingly, the sealing collar 24 abuts circumferentially against the flat tube 20 at the height of the trailing frame member 28.

The inner surfaces 34 may be formed to be slightly convex, thus, convex in the direction of the receiving pocket 31, prior to insertion of the heating cell 22.

Figure 5:
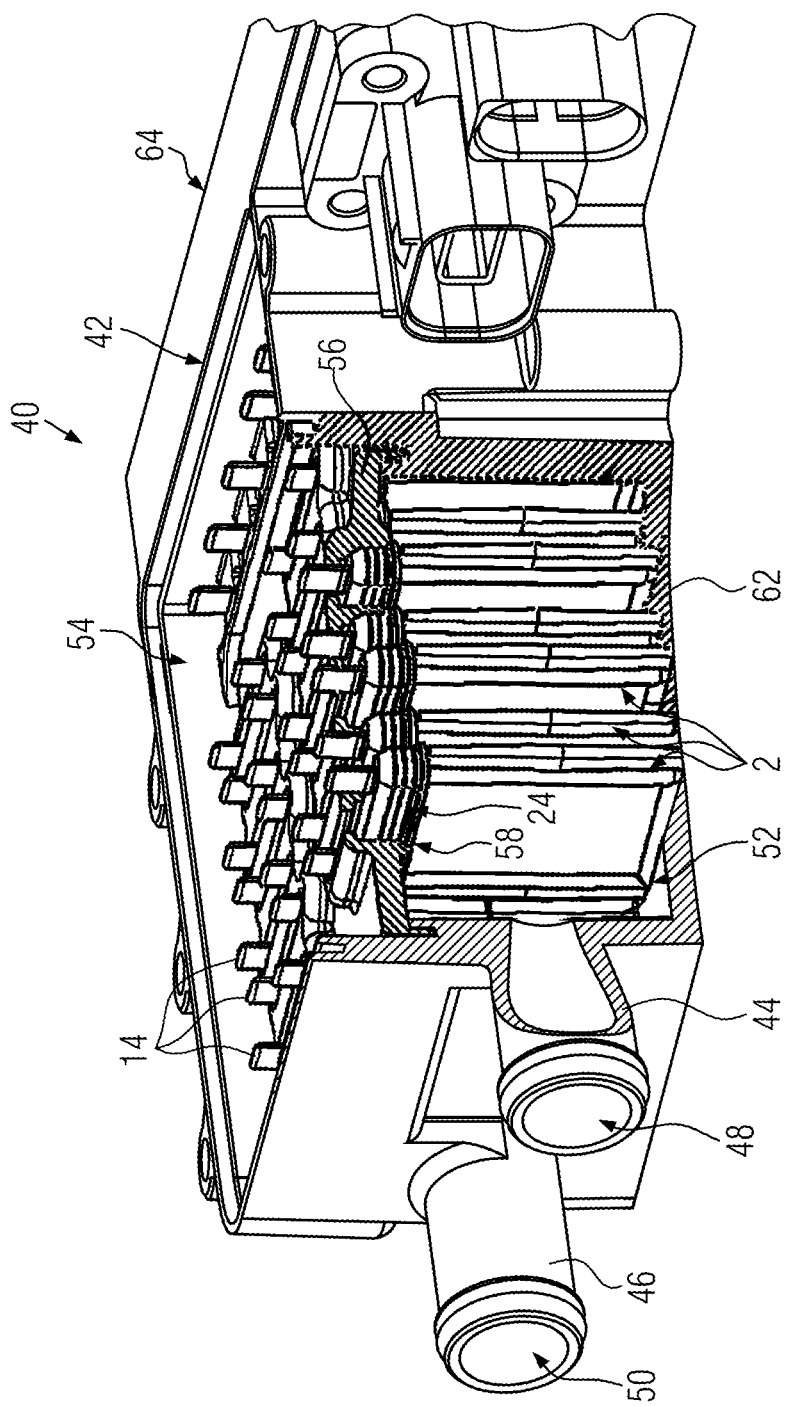
FIG. 5 shows a perspective side of the embodiment of a PTC heating device.

FIG. 5 shows a perspective top view onto a heating device housing marked with reference numeral 40 of an electric heating device formed as a water heater. The heater housing 40 has a casing tub element 42 made of plastic material. The heating device housing 40 forms an inlet port 44 and an outlet port 46 which are presently embodied formed integrally on the casing tub element 42. The ports 44, 46 are designed as hose connection ports and form an inlet opening 48 and an outlet opening 50, respectively, to a heating chamber designated with reference numeral 52.

The heating chamber 52 is separated from a connection chamber 54 and sealed thereagainst by a partition wall 56 made of plastic material. The partition wall 56 forms female plug element holding fixtures 58 for PTC heating elements 22 which are inserted into the female plug element holding fixtures 58, sealed therein by a sealing collar 24 and supported on a base 62 of the casing tub element 42. Reference numeral 64 identifies a control housing, described in further detail in DE 10 2019 205 848.

Alternatively, the flat tube 20 can also be connected directly to the partition wall 56 by a material bond, for example by gluing or soldering, instead of using a sealing collar. The partition wall 56 can be made of metal. Only a fluid-tight connection between the flat tube 20 and the partition wall 56 is significant. The flat tube 20 can also be integrally formed with the partition wall 56.

The invention claimed is:

1. A method for producing a PTC heating assembly having a heater housing in which a heating cell is accommodated, the heating cell comprising a PTC element and conductor elements electrically abutting the PTC element, the method comprising:
   inserting the heating cell into the heater housing; and
   elastically expanding the heater housing when the heating cell is inserted into the heater housing so that opposite walls of the heater housing abut the heating cell under pretension after the heating cell has been inserted into the heater housing;
   wherein the heater housing is formed by a flat tube which is closed on one side at a receiving pocket, wherein inner surfaces of the flat tube lie opposite one another and abut against the heating cell in a heat-conducting manner and are spaced apart from one another by a smaller distance than a thickness of the heating cell; and
   wherein the receiving pocket has a larger width than a distance between the inner surfaces of the flat tube.

2. The method according to claim 1, wherein
   an insertion opening of the flat tube has a larger width than a distance between the inner surfaces of the flat tube, and wherein
   the heating cell is inserted with clearance into the insertion opening and, with increasing insertion movement, the heating cell elastically presses outwards the inner surfaces of the of the flat tube outwards so that, in the installation position thereof, the heating cell is applied under pretension against the inner surfaces.

3. The method according to claim 2, wherein
   the heating cell has a frame-shaped casing which joins the PTC element and the conductor elements in a heat-conducting manner as a unit and which is surmounted by contact strips which are electrically conductively connected to the conductor elements for energizing the PTC element with different polarity, and wherein
   the frame-shaped casing has a wedge-shaped leading frame member which can be inserted first into the insertion opening and which is configured to be adapted for spreading the inner surfaces of the flat tube.

4. The method according to claim 3, wherein the frame-shaped casing has a trailing frame member which is inserted as a plug into the flat tube.

5. The method according to claim 4, further comprising a sealing collar which seals the flat tube, at least around an outside of the flat tube in the region of the insertion opening.

6. The method according to claim 5, wherein the sealing collar is arranged at a height of the trailing frame member.

7. The method according to claim 1, wherein the PTC element further comprises insulating layers abutting against the PTC element.

8. The method according to claim 1, wherein the inner surfaces of the heater housing are convex.

9. A method for producing a PTC heating assembly having a heater housing in which a heating cell is accommodated, the heating cell comprising a PTC element and conductor elements electrically abutting the PTC element, the method comprising:
   inserting the heating cell into the heater housing; and
   elastically expanding the heater housing when the heating cell is inserted into the heater housing so that opposite walls of the heater housing abut the heating cell under pretension after the heating cell has been inserted into the heater housing;
   wherein the heater housing is formed by a flat tube which is closed on one side, wherein inner surfaces of the flat tube lie opposite one another and abut against the heating cell in a heat-conducting manner and are spaced apart from one another by a smaller distance than a thickness of the heating cell, wherein
   wherein an insertion opening of the flat tube has a larger width than a distance between the inner surfaces of the flat tube;
   wherein the heating cell is inserted with clearance into the insertion opening and, with increasing insertion movement, the heating cell elastically presses outwards the inner surfaces of the of the flat tube outwards so that, in the installation position thereof, the heating cell is applied under pretension against the inner surfaces;
   wherein the heating cell has a frame-shaped casing which joins the PTC element and the conductor elements in a heat-conducting manner as a unit and which is surmounted by contact strips which are electrically conductively connected to the conductor elements for energizing the PTC element with different polarity; and
   wherein the frame-shaped casing has a wedge-shaped leading frame member which can be inserted first into the insertion opening and which is configured to be adapted for spreading the inner surfaces of the flat tube.

10. The method according to claim 9, wherein the frame-shaped casing has a trailing frame member which is inserted as a plug into the flat tube.

11. The method according to claim 10, further comprising a sealing collar which seals the flat tube, at least around an outside of the flat tube in the region of the insertion opening.

12. The method according to claim 11, wherein the sealing collar is arranged at a height of the trailing frame member.

13. The method according to claim 9, wherein the inner surfaces of the heating housing are convex.

* * * * *